(12) United States Patent
Taylor et al.

(10) Patent No.: US 10,362,203 B2
(45) Date of Patent: Jul. 23, 2019

(54) CAMERA ASSEMBLY METHOD WITH ADHESIVE SHRINK OFFSET BASED ON INDIVIDUAL LENS CHARACTERISTIC

(71) Applicant: APTIV TECHNOLOGIES LIMITED, St. Michael (BB)

(72) Inventors: Ronald M. Taylor, Greentown, IN (US); Morgan D. Murphy, Kokomo, IN (US)

(73) Assignee: APTIV TECHNOLOGIES LIMITED (BB)

( * ) Notice: Subject to any disclaimer, the term of this patent is extended or adjusted under 35 U.S.C. 154(b) by 185 days.

(21) Appl. No.: 15/676,164

(22) Filed: Aug. 14, 2017

(65) Prior Publication Data

US 2019/0052779 A1 Feb. 14, 2019

(51) Int. Cl.
| | |
|---|---|
| G02B 7/02 | (2006.01) |
| H04N 5/225 | (2006.01) |
| G02B 3/00 | (2006.01) |
| G02B 7/00 | (2006.01) |
| G02B 7/36 | (2006.01) |
| G02B 13/16 | (2006.01) |
| G02B 27/62 | (2006.01) |

(Continued)

(52) U.S. Cl.
CPC ......... H04N 5/2254 (2013.01); G02B 3/0075 (2013.01); G02B 7/003 (2013.01); G02B 7/005 (2013.01); G02B 7/02 (2013.01); G02B 7/36 (2013.01); G02B 13/16 (2013.01); G02B 27/62 (2013.01); H04N 5/2252 (2013.01); H04N 5/2253 (2013.01); H04N 17/002 (2013.01); H04N 5/23212 (2013.01)

(58) Field of Classification Search
CPC ....................................................... G02B 7/02
See application file for complete search history.

(56) References Cited

U.S. PATENT DOCUMENTS

| | | | |
|---|---|---|---|
| 2007/0221826 A1* | 9/2007 | Bechtel | G02B 3/005 250/208.1 |
| 2013/0274923 A1 | 10/2013 | By | |
| 2017/0201744 A1 | 7/2017 | Wong et al. | |

OTHER PUBLICATIONS

"Epoxy Adhesive Application Guide", Jan. 1, 2016, Retrieved from the Internet: URL:http://www.epotek.com/site/files/brochures/pdfs/adjesive_application_guide.pdf, 48 pages—p. 39-p. 41.

* cited by examiner

Primary Examiner — Jeffry H Aftergut
(74) Attorney, Agent, or Firm — Lawrence D. Hazelton

(57) ABSTRACT

A method of assembling a camera includes the steps of determining a focused-position of a lens relative to an imager where an image is focused on the imager, determining a first-factor indicative of focus quality at a central-portion of the imager, and determining a second-factor indicative of focus quality at an outer-portion of the imager. The outer-portion is characterized as displaced radially outward from the central-portion. The method also includes the steps of determining an actual-ratio of the first-factor and the second-factor, and determining an offset-position of the lens relative to the imager based on the focused-position, a ratio-difference between the actual-ratio and a desired-ratio, and an expansion-characteristic of an adhesive that is used to fixedly couple the lens to the imager. The method also includes the step of applying the adhesive to fixedly couple the lens to the imager while the lens is in the offset-position.

3 Claims, 4 Drawing Sheets

(51) Int. Cl.
*H04N 17/00* (2006.01)
*H04N 5/232* (2006.01)

CAMERA ASSEMBLY METHOD WITH ADHESIVE SHRINK OFFSET BASED ON INDIVIDUAL LENS CHARACTERISTIC

TECHNICAL FIELD OF INVENTION

This disclosure generally relates to a method of assembling a camera, and more particularly relates to determining an offset-position of a lens relative to an imager with respect to a focused-position for applying an adhesive that is used to fixedly couple the lens to the imager, where the offset-position is determine based on an individual characteristic of the lens and an expansion-characteristic of the adhesive.

BACKGROUND OF INVENTION

The present camera assembly process positions a lens relative to an imager of the camera to find an optimized modulation transfer function (MTF) values (a measure of focus quality) and then moves the lens a constant or predetermined adhesive-offset to compensate for the curing shrinkage of the adhesive used to fixedly couple or attach the lens to the imager. However, for some instances of lens there is a part-to-part inconsistency in a ratio of corner MTF values to the center MTF values, e.g. the ratio={average_corner_MTF}/{center_MTF}. This ratio is important to maintain proper balance in MTF over temperature. For example, if the ratio is too low, the corner values will be incorrect and may drop below the manufacturing specification. Similarly, if the ratio is too high, then the center values may drop below the manufacturing specification.

SUMMARY OF THE INVENTION

Described herein is a technique that will allow for an improvement to the camera assembly/focus/alignment process by applying a variable (instead of constant) adhesive-offset based upon the individual camera's lens focus characteristic as measured by the ratio value of each individual lens.

In accordance with one embodiment, a method of assembling a camera is provided. The method includes the steps of determining a focused-position of a lens relative to an imager where an image is focused on the imager, determining a first-factor indicative of focus quality at a central-portion of the imager, and determining a second-factor indicative of focus quality at an outer-portion of the imager. The outer-portion is characterized as displaced radially outward from the central-portion. The method also includes the step of determining an actual-ratio of the first-factor and the second-factor. The method also includes the step of determining an offset-position of the lens relative to the imager based on the focused-position, a ratio-difference between the actual-ratio and a desired-ratio, and an expansion-characteristic of an adhesive that is used to fixedly couple the lens to the imager. The method also includes the step of applying the adhesive to fixedly couple the lens to the imager while the lens is in the offset-position.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
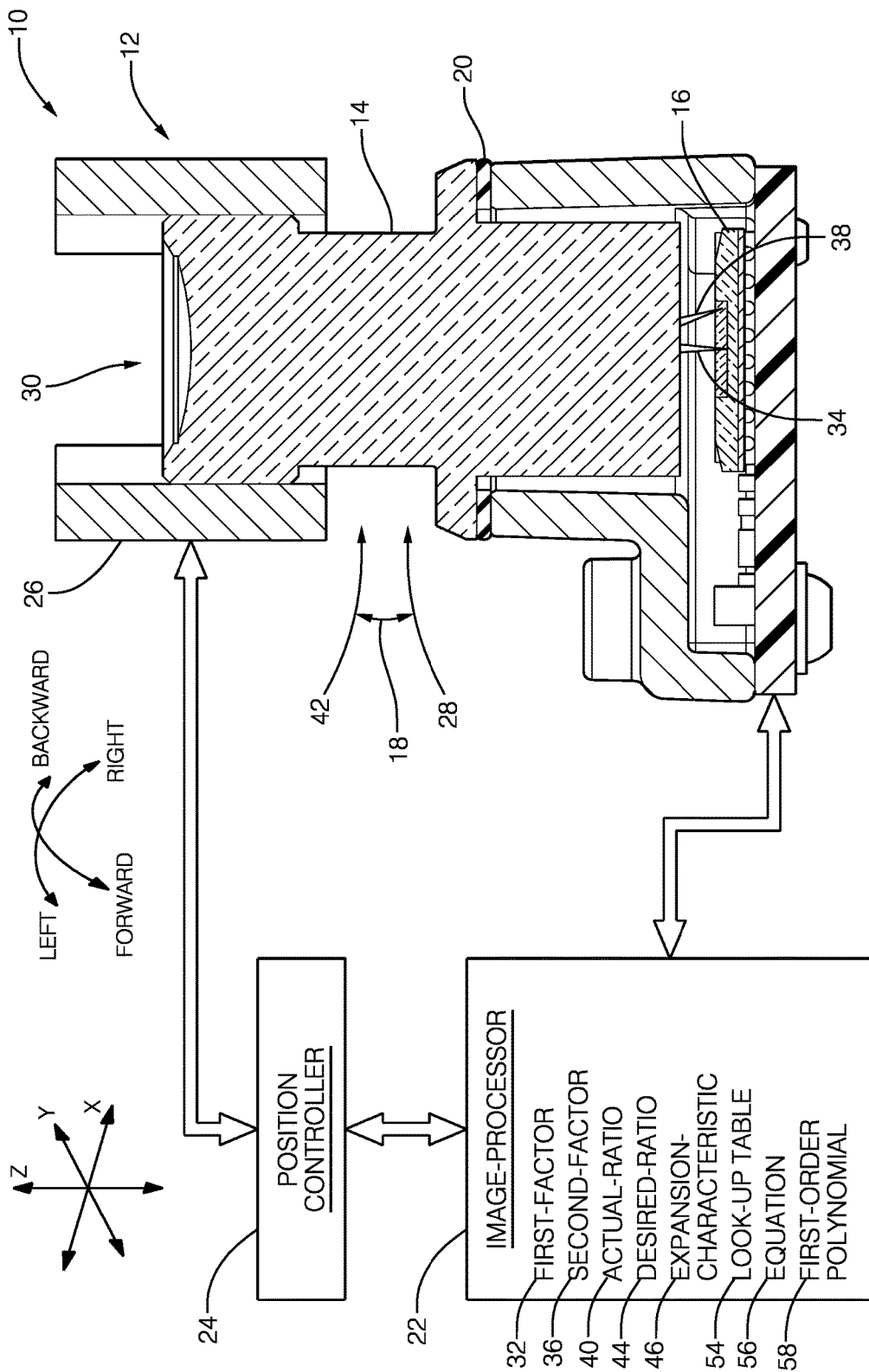
FIG. 1 is a diagram of a system used to assembly a camera in accordance with one embodiment.

FIG. 1 illustrates a non-limiting example of a system 10 for assembling a camera 12 that includes a lens assembly, hereafter referred to as the lens 14, and an imager 16 such as an integrated circuit equipped with an array of light detection pixels. The system 10 performs a method 100 (FIG. 2) for an aligning the lens 14 to the imager 16 prior to adjusting the spacing between the lens 14 and the imager 16 by an adhesive-offset 18 before an adhesive 20 is applied and/or cured. The system 10 includes an image-processor 22 that analyzes an image focused by the lens 14 onto the imager 16 and operates a position-controller 24 that manipulates the position of a gripper 26 to optimize the image. The gripper 26 is used to hold the lens 14 and maintain the position of the lens 14 relative to the imager 16 before the adhesive 20 is applied and/or cured. The position-controller 24 may be a collection of servos and/or micro-motion machines used to move the gripper 26 along the X, Y, and Z axis, tilt the lens 14 left/right or forward/backward, or rotate the lens about any axis, as will be recognized by those in the art.

Figure 2:
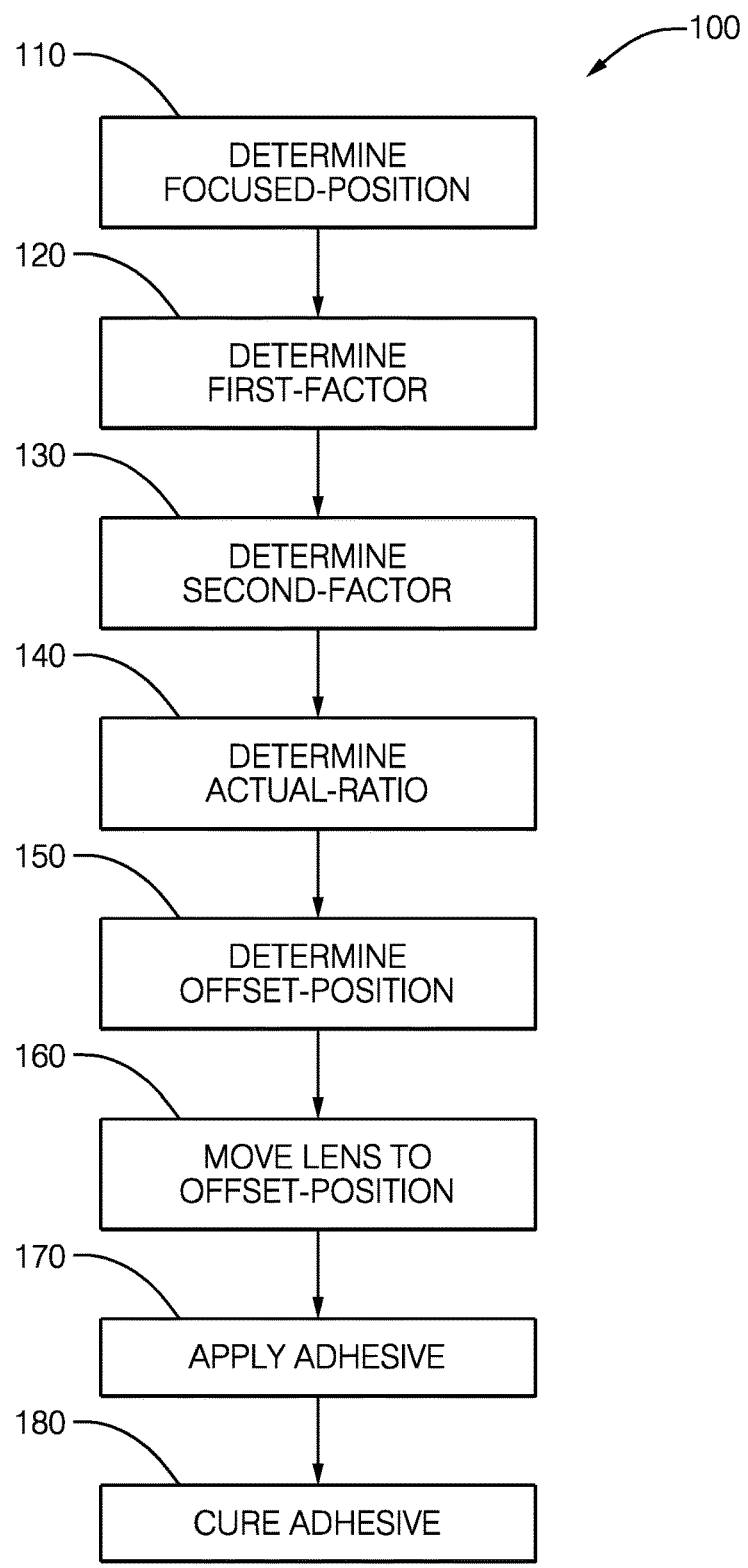
FIG. 2 is a flowchart of a method to assemble the camera of FIG. 1 in accordance with one embodiment.

FIG. 2 illustrates a non-limiting example of a method 100 of assembling the camera 12 of FIG. 1. As will be explained in more detail below, an improvement provided by the method 100 is based on the individual characterization of the particular instance of the lens 14. That is, the value of the adhesive-offset 18 is determined based on a determined or measured characteristic of the specific instance of the lens 14 being used to form the specific instance of the camera 12 being assembled.

Step 110, DETERMINE FOCUSED-POSITION, may include determining a focused-position 28 (FIG. 1) of the lens 14 relative to the imager 16. As used herein, the focused-position is the location of the lens relative to the imager 16 where an image 30 (e.g. an optical test pattern) is optimally focused on the imager 16 based on some selected criteria. By way of example and not limitation, the selected criteria may be where the center of the image and the periphery of the image are not perfectly focused, but a donut or ring shaped portion of the image is focused as close to perfectly as possible. Alternatively, a better camera focus may be determined by an optimum focus position between an ideal center focus position and an ideal periphery focus position. Various sub-steps that may be part of Step 110 may include, but are not limited to, preforming a pre-alignment scan to find starting scan position, performing a Z-axis scan to check for focus peaks at the corners and center of the image, and/or preforming a centration of lens 14 to imager 16.

Step 120, DETERMINE FIRST-FACTOR, may include determining a first-factor 32 (FIG. 1) indicative of focus quality at a central-portion 34 of the imager 16. By way of example and not limitation, the first-factor 32 may be based on or correspond to a modulation transfer function (MTF)

of, for example, the center ten percent (10%) of the imaging area of the imager 16, which may be referred to elsewhere herein as the center_MTF.

Step 130, DETERMINE SECOND-FACTOR, may include determining a second-factor 36 indicative of focus quality at an outer-portion 38 of the imager. As used herein, the outer-portion 38 may be characterized as displaced radially outward from the central-portion 34. As non-limiting examples, the outer-portion could be a single area near a corner, a combination of multiple areas at multiple corners, or a ring/donut shaped area where the central-portion 34 may be located within but distinct or different from the outer-portion 38. The second-factor 36 may be referred to elsewhere herein as the average_corner_MTF, but this reference is not intended to limit possible shapes or configurations of the outer-portion 38.

Figure 4:
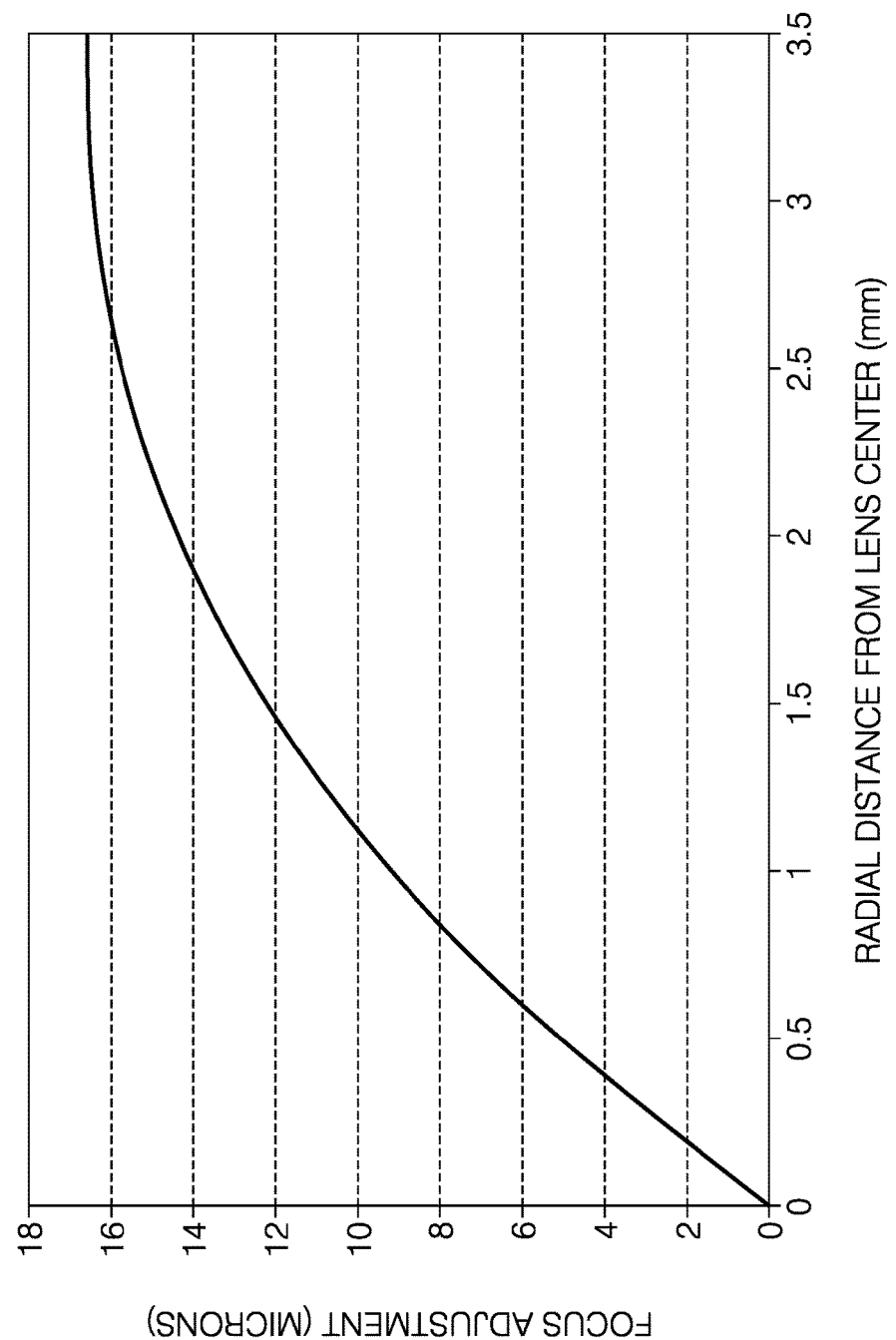
FIG. 4 is a graph of a characteristic of a lens used in the camera of FIG. 1 in accordance with one embodiment.

Step 140, DETERMINE ACTUAL-RATIO, may include determining (i.e. calculating) an actual-ratio 40 of the first-factor 32 and the second-factor 36 (e.g. actual-ratio=second-factor/first-factor, or actual-ratio=first-factor/second-factor) which may include a weighting factor applied to one of the first-factor 32 or the second-factor 36 if desired. FIG. 4 illustrates a non-limiting example of a graph 50 that shows how the focus adjustment changes as a function of radial distance from lens center (i.e. distance from a bore site of the lens 14 across the face or imaging surface of the imager 16.

Step 150, DETERMINE OFFSET-POSITION, may include determining an offset-position 42 of the lens 14 relative to the imager 16 based on the focused-position 28, an arithmetic-difference or a ratio-difference between the actual-ratio 40 and a desired-ratio 44, and an expansion-characteristic 46 of the adhesive 20 used to fixedly couple the lens 14 to the imager 16. As used herein, the desired-ratio 44 is representative of what the actual-ratio 40 would be if the lens 14 were a nominal or typical part. However, because or part-to-part variability, the actual-ratio 40 does not match the desired-ratio 44, so the offset-position 42 is adjusted for this difference so that the effects of shrinkage and subsequent thermal expansion of the adhesive 20 does not cause the camera 12 to become out-of-specification because either the first-factor 32 (e.g. the center_MTF) or the second-factor 36 (e.g. the average_corner_MTF) to become out-of-specification.

Figure 3:
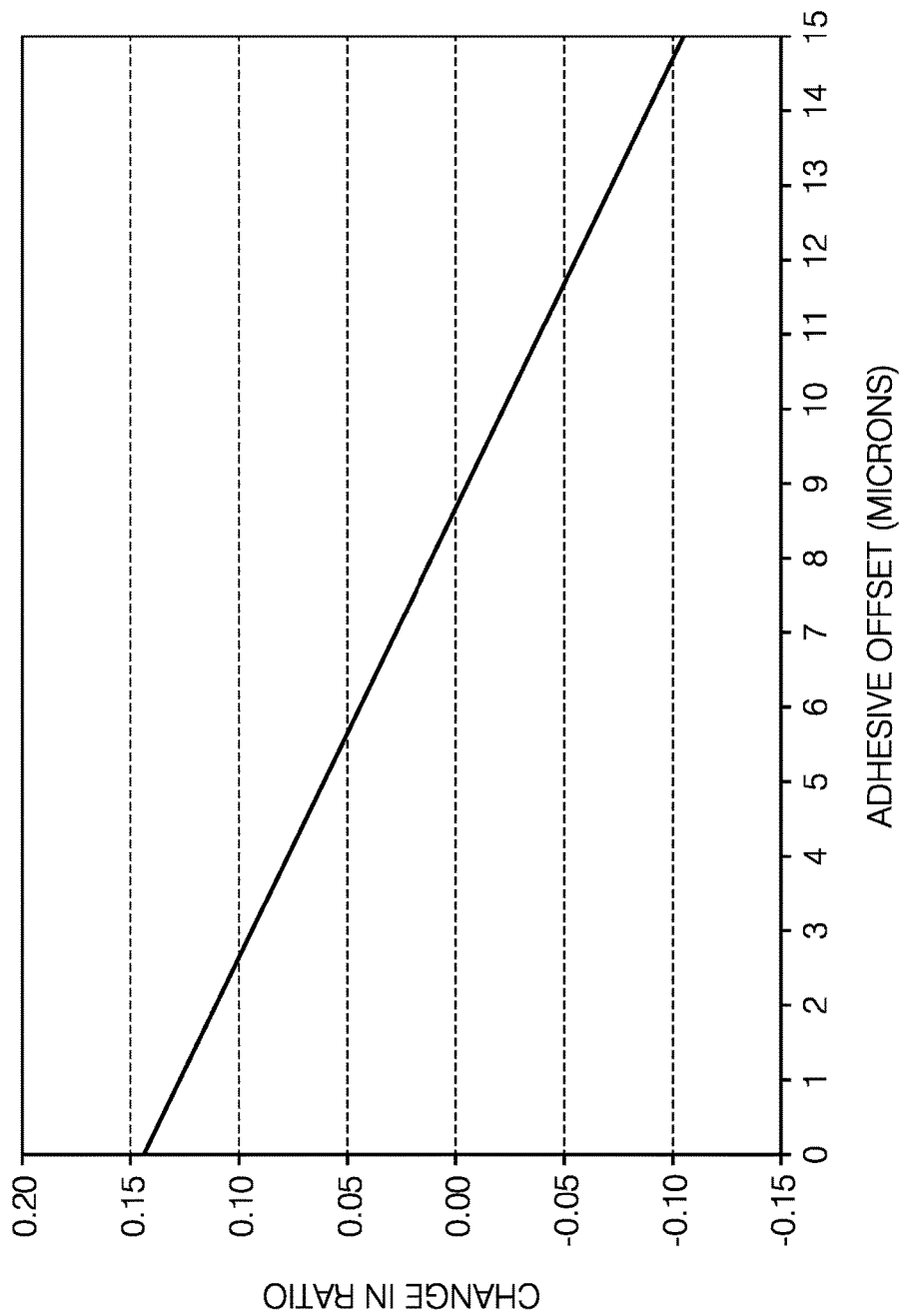
FIG. 3 is a graph of how much offset is recommended for a characteristic of a lens used in the camera of FIG. 1 in accordance with one embodiment.

FIG. 3 illustrates a non-limiting example of a graph 52 used to determine the value of the adhesive-offset 18 necessary to compensate for the actual-ratio 40 described above to obtain performance as close as possible to the desired ratio 44. The graph 52 stands in contrast to previous methods to assembly the camera 12 that used a constant offset for the adhesive. Information provided by the graph 52 may be stored in the image-processor in the form of a look-up table.

Alternatively, the ratio-difference between the actual-ratio 40 and the desired-ratio 44 may related to a position-difference between the focused-position 28 and the offset-position 42 by an equation 56 representative of a defocus-characteristic of the lens 14. By way of example and not limitation, the equation may be or may be characterized as a first-order polynomial 58.

Step 160, MOVE LENS TO OFFSET-POSITION, may include moving the lens 14 to the offset-position 42 prior to applying the adhesive 20.

Step 170, APPLY ADHESIVE, may include applying (e.g. injecting) the adhesive 20 to fixedly couple the lens 14 to the imager 16 while the lens is in the offset-position 42. In one embodiment, the adhesive 20 shown in FIG. 1 would not be present until the lens 14 was at the offset-position 42. Alternatively, the adhesive 20 may be applied before the lens 14 is at the offset-position 42. It is also contemplated that the adhesive 20 could optionally be dispensed before the lens 14 is inserted into the assembly around the imager 16.

Step 180, CURE ADHESIVE, may include curing the adhesive 20 by exposing the adhesive to ultra-violet (UV) light, heat, or any combination thereof necessary to cure the adhesive 20 selected to assemble the camera 12.

Accordingly, a method 100 of assembling the camera 12 is provided. The image-processor 22 and the position-controller 24 cooperate to perform the alignment process which includes compensating for the difference between the desired-ratio 44 and the actual-ratio 40. It is expected that the process yield for assembling the camera 12 may be improved by 50% because of this individual compensation. The method 100 provides an improved focus technique that allows a wider range of lens depth of focus variation to be utilized and compensates for lens depth of focus imbalance. The method 100 avoids what would be other more difficult or costly solutions (e.g. pre-sorting or serializing lenses, multiple batch operations based upon the lens variation or raising lens image quality specification). The method 100 reduces production fallout caused by the prior technique of using a constant adhesive offset.

While this invention has been described in terms of the preferred embodiments thereof, it is not intended to be so limited, but rather only to the extent set forth in the claims that follow.

We claim:

1. A method of assembling a camera, said method comprising:
    determining a focused-position of a lens relative to an imager where an image is focused on the imager;
    determining a first-factor indicative of focus quality at a central-portion of the imager;
    determining a second-factor indicative of focus quality at an outer-portion of the imager, wherein the outer-portion is characterized as displaced radially outward from the central-portion;
    determining an actual-ratio of the first-factor and the second-factor;
    determining an offset-position of the lens relative to the imager based on the focused-position, a ratio-difference between the actual-ratio and a desired-ratio, and an expansion-characteristic of an adhesive used to fixedly couple the lens to the imager; and
    applying the adhesive to fixedly couple the lens to the imager while the lens is in the offset-position.

2. The method in accordance with claim 1, wherein the ratio-difference is related to a position-difference between the focused-position and the offset-position by an equation representative of a defocus-characteristic of the lens.

3. The method in accordance with claim 2, wherein the equation is characterized as a first-order polynomial.

* * * * *